United States Patent
Zaric et al.

(10) Patent No.: US 9,703,759 B2
(45) Date of Patent: Jul. 11, 2017

(54) FOOTNOTE ZONE DETECTION IN A FIXED FORMAT DOCUMENT USING NUMBER OF PARAGRAPHS IN FOOTNOTE DESCRIPTION

(71) Applicant: MICROSOFT TECHNOLOGY LICENSING, LLC, Redmond, WA (US)

(72) Inventors: Drazen Zaric, Belgrade (RS); Milos Raskovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 13/745,127

(22) Filed: Jan. 18, 2013

(65) Prior Publication Data

US 2014/0208192 A1    Jul. 24, 2014

(51) Int. Cl.
| | | |
|---|---|---|
| H03M 5/00 | (2006.01) | |
| H03M 7/00 | (2006.01) | |
| H03M 7/30 | (2006.01) | |
| G06F 17/22 | (2006.01) | |
| G06F 17/27 | (2006.01) | |
| G06F 17/30 | (2006.01) | |
| G06F 17/24 | (2006.01) | |
| G06K 9/00 | (2006.01) | |
| G06F 17/21 | (2006.01) | |

(52) U.S. Cl.
CPC ........ *G06F 17/2235* (2013.01); *G06F 17/211* (2013.01); *G06F 17/241* (2013.01); *G06F 17/27* (2013.01); *G06F 17/30728* (2013.01); *G06K 9/00442* (2013.01); *G06F 17/212* (2013.01); *G06K 9/00463* (2013.01)

(58) Field of Classification Search
CPC ... G06F 17/24; G06F 17/3089; G06F 17/2247
USPC ........................................................ 715/205
See application file for complete search history.

(56) References Cited

U.S. PATENT DOCUMENTS

| | | | |
|---|---|---|---|
| 4,503,515 A | | 3/1985 | Cuan et al. |
| 4,648,067 A | * | 3/1987 | Repass et al. ................ 715/205 |
| 5,111,397 A | * | 5/1992 | Chirokas ............... G06F 17/241 |
| | | | 715/205 |
| 5,870,767 A | | 2/1999 | Kraft, IV |

(Continued)

OTHER PUBLICATIONS

"Footnotes and Endnotes", Retrieved on: Nov. 20, 2012, http://word.tips.net/C0066_Footnotes_and_Endnotes.html, 6 pages.

(Continued)

*Primary Examiner* — Cesar Paula
*Assistant Examiner* — Luu-Phuong Nguyen
(74) *Attorney, Agent, or Firm* — Merchant & Gould P.C.

(57) ABSTRACT

Footnote detection is provided. When converting a fixed format document to a flow format document, footnotes, which may include a footnote description and a footnote reference mark, may be detected and linked with a corresponding footnote reference mark in a main document flow on a page. Additionally, a footnote numbering scheme may be determined and applied to detected footnotes. By providing footnote detection when converting a fixed format document to a flow format document, footnotes may be statically positioned at the end of a page containing the corresponding footnote reference mark.

20 Claims, 8 Drawing Sheets

(56) References Cited

U.S. PATENT DOCUMENTS

| | | | |
|---|---|---|---|
| 8,023,738 B1* | 9/2011 | Goodwin | G06K 9/00469 382/175 |
| 8,023,740 B2 | 9/2011 | Dejean | |
| 8,254,681 B1* | 8/2012 | Poncin et al. | 382/180 |
| 8,276,090 B2 | 9/2012 | Chen et al. | |
| 2007/0237428 A1* | 10/2007 | Goodwin et al. | 382/309 |
| 2010/0306260 A1* | 12/2010 | Dejean | G06F 17/2745 707/776 |
| 2013/0223743 A1* | 8/2013 | Deryagin | G06K 9/00469 382/180 |

OTHER PUBLICATIONS

"Chapter 16. Footnotes", Retrieved on: Nov. 20, 2012, http://www.sagehill.net/docbookxsl/Footnotes.html, 2 pages.

Glushko, Robert J., "Design Issues for Multi-Document Hypertexts", In Proceedings of Hypertext, Nov. 1989, http://courses.ischool.berkeley.edu/i290-4/s02/readings/glushko_multidocs.pdf, 10 pages.

* cited by examiner

Lorem ipsum dolor sit amet, consectetuer adipiscing elit. Maecenas porttitor congue massa. Fusce posuere, magna sed pulvinar ultricies, purus lectus malesuada libero[1], sit amet commodo magna eros quis urna. Nunc viverra imperdiet enim. Fusce est. Vivamus a tellus.

Pellentesque habitant morbi tristique senectus et netus et malesuada fames ac turpis egestas. Proin pharetra nonummy pede. Mauris et orci. Aenean nec lorem. In porttitor. Donec laoreet nonummy augue.

[1] Footnote description text

FOOTNOTE ZONE DETECTION IN A FIXED FORMAT DOCUMENT USING NUMBER OF PARAGRAPHS IN FOOTNOTE DESCRIPTION

BACKGROUND

Flow format documents and fixed format documents are widely used and have different purposes. Flow format documents organize a document using complex logical formatting objects such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document may be converted into a flow format document. Conversion involves parsing the fixed format document and transforming the basic physical layout elements from the fixed format document into the more complex logical elements used in a flow format document.

Footnotes are a common element in everyday documents. Oftentimes, footnotes are used to add additional explanations about certain content. Accordingly, footnotes may be linked with certain text from regular document text flow. Most often, fixed format documents do not contain information about document layout elements such as footnotes. That is, in a fixed format document, footnotes may be represented as normal text and may not include an indication that characters or text-runs within the footnote(s) are in fact part of the footnote(s). Currently, when converting a fixed format document with one or more footnotes to a flow format document, the footnotes may be reconstructed as part of the regular text flow. If the fixed format document includes a reference note mark (i.e., a mark in the normal text flow that links a footnote with text, usually a superscript located at the end of a word), the footnote may not be linked to the reference note mark. Additionally, after conversion to a flow format document, footnote positioning may oftentimes be incorrect. For example, when a document is converted from a fixed format document to a flow format document or when a flow format document is edited, the text may oftentimes reflow. When a footnote is part of the regular text flow, the text in the footnote may reflow with the text instead of being statically positioned at the end of a page. Moreover, if the document includes a reference note mark, the reference note mark and the footnote may not be located on the same page.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing detection of footnotes in a fixed format document and restructuring of footnotes when converting a fixed format document to a flow format document. When converting a fixed format document to a flow format document, embodiments provide for detecting a footnote zone on a page in the document; detecting one or more paragraphs in the footnote zone; determining which of the one or more paragraphs belong to a footnote description of a footnote; detecting a corresponding footnote reference mark in a main document flow on the page for each footnote; and linking each footnote with the corresponding footnote reference mark in the main document flow on the page. Additionally, a footnote numbering scheme may be determined and applied to detected footnotes. By providing footnote detection when converting a fixed format document to a flow format document, footnotes may be statically positioned at the end of a page containing the corresponding footnote reference mark.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

As briefly described above, embodiments of the present invention are directed to providing detection of footnotes in a fixed format document and restructuring of footnotes when converting a fixed format document to a flow format document. According to embodiments, one or more footnote candidates may be detected in a fixed format document. Detected footnotes may be linked with text representing a footnote reference mark in a main document flow on a page. Embodiments may also provide for determining a footnote number scheme and applying the numbering scheme to detected footnotes.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1:
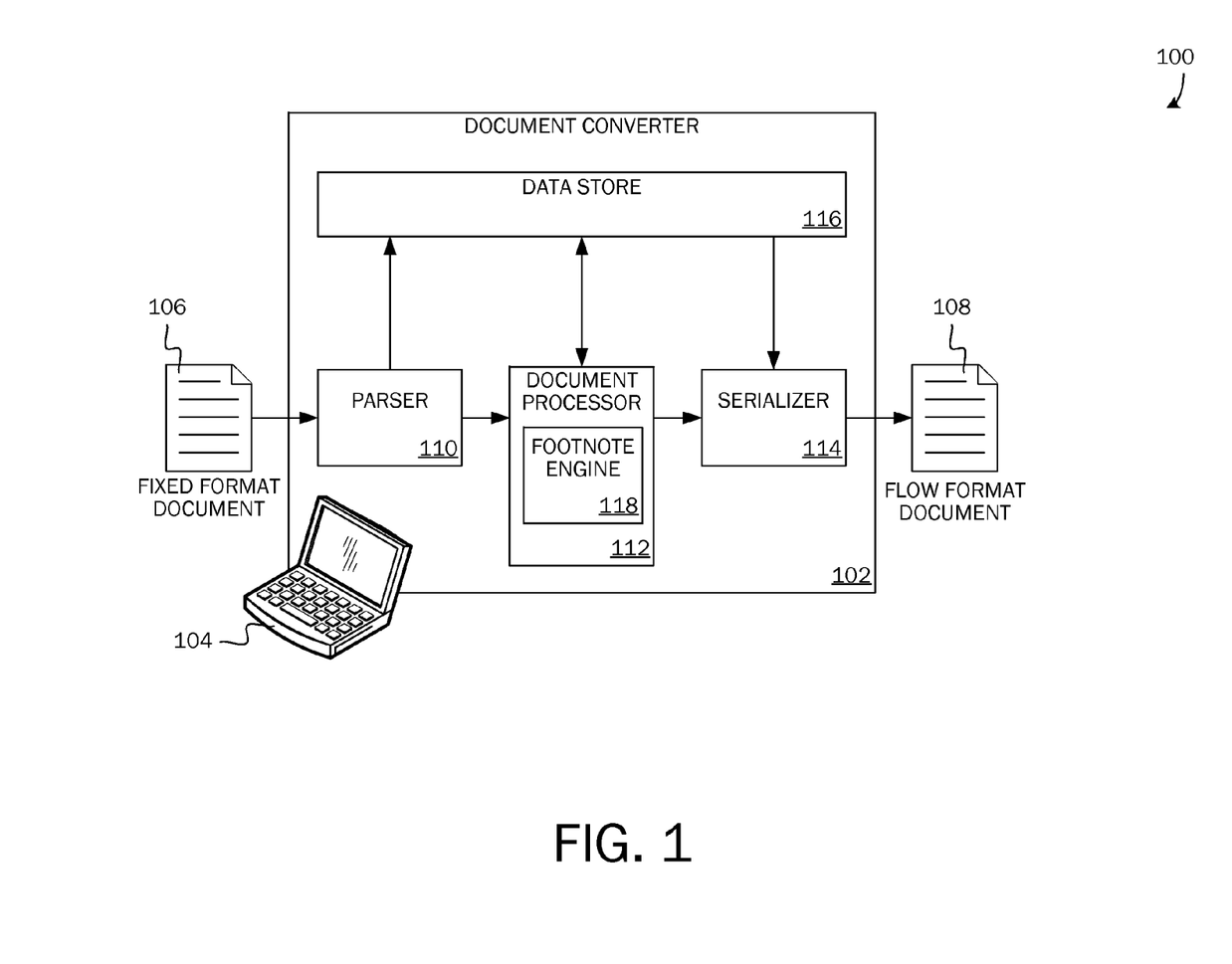
FIG. 1 is a block diagram of one embodiment of a system including a document converter.

Referring now to the drawings, in which like numerals represent like elements, various embodiments will be described. FIG. 1 illustrates one embodiment of a system 100 incorporating a footnote engine 118. In the illustrated embodiment, the footnote engine 118 operates as part of a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the footnote engine 118 of the present invention). Finally, the serializer 114 writes the flowable elements into a flowable document format (e.g., a word processing format).

Figure 2:
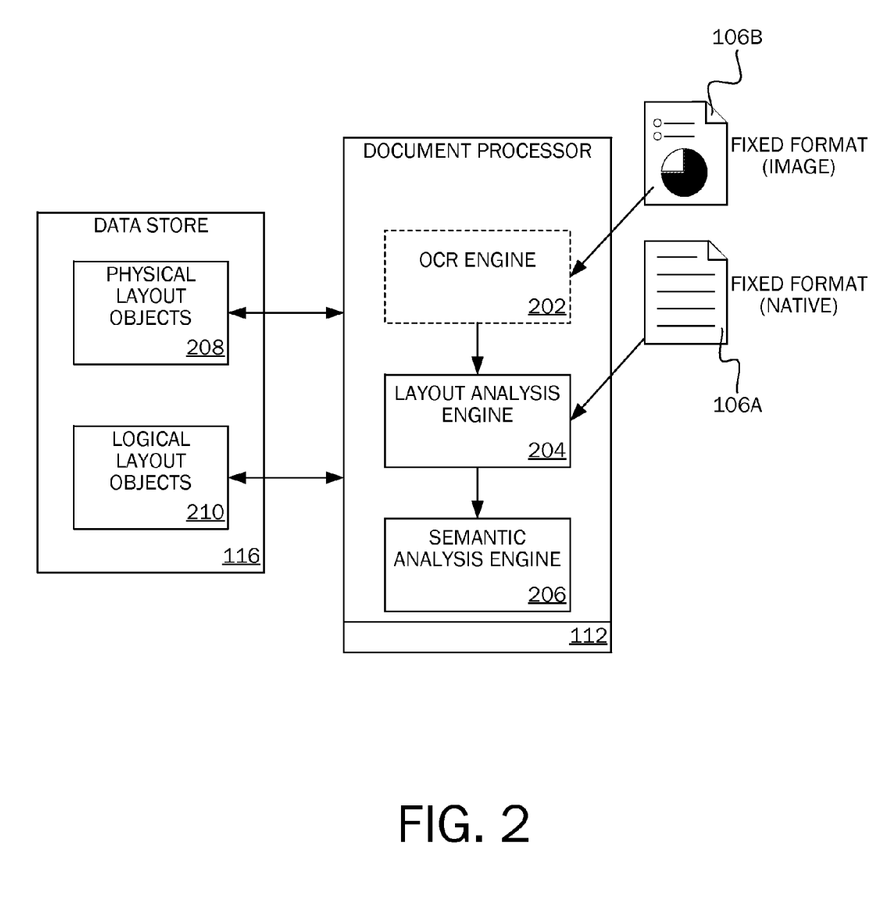
FIG. 2 is a block diagram showing an operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, while a section is the top level group for the logical layout objects 210. The data extracted from the fixed format document 106 is generally stored as physical layout objects 208 organized by the containing page in the fixed format document 106. The basic physical layout objects 208 include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical layout objects 210 include flowable elements such as sections, paragraphs, columns, tables, and lists.

Where processing begins depends on the type of fixed format document 106 being parsed. A native fixed format document 106A created directly from a flow format source document contains some or all of the basic physical layout elements. The embedded data objects are extracted by the parser and are available for immediate use by the document converter; although, in some instances, minor reformatting or other minor processing is applied to organize or standardize the data. In contrast, all information in an image-based fixed format document 106B created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 analyzes the layout of the fixed format document. After layout analysis is complete, the semantic analysis engine 206 enriches the logical layout objects with semantic information obtained from analysis of the physical layout objects and/or logical layout objects.

Figure 3:
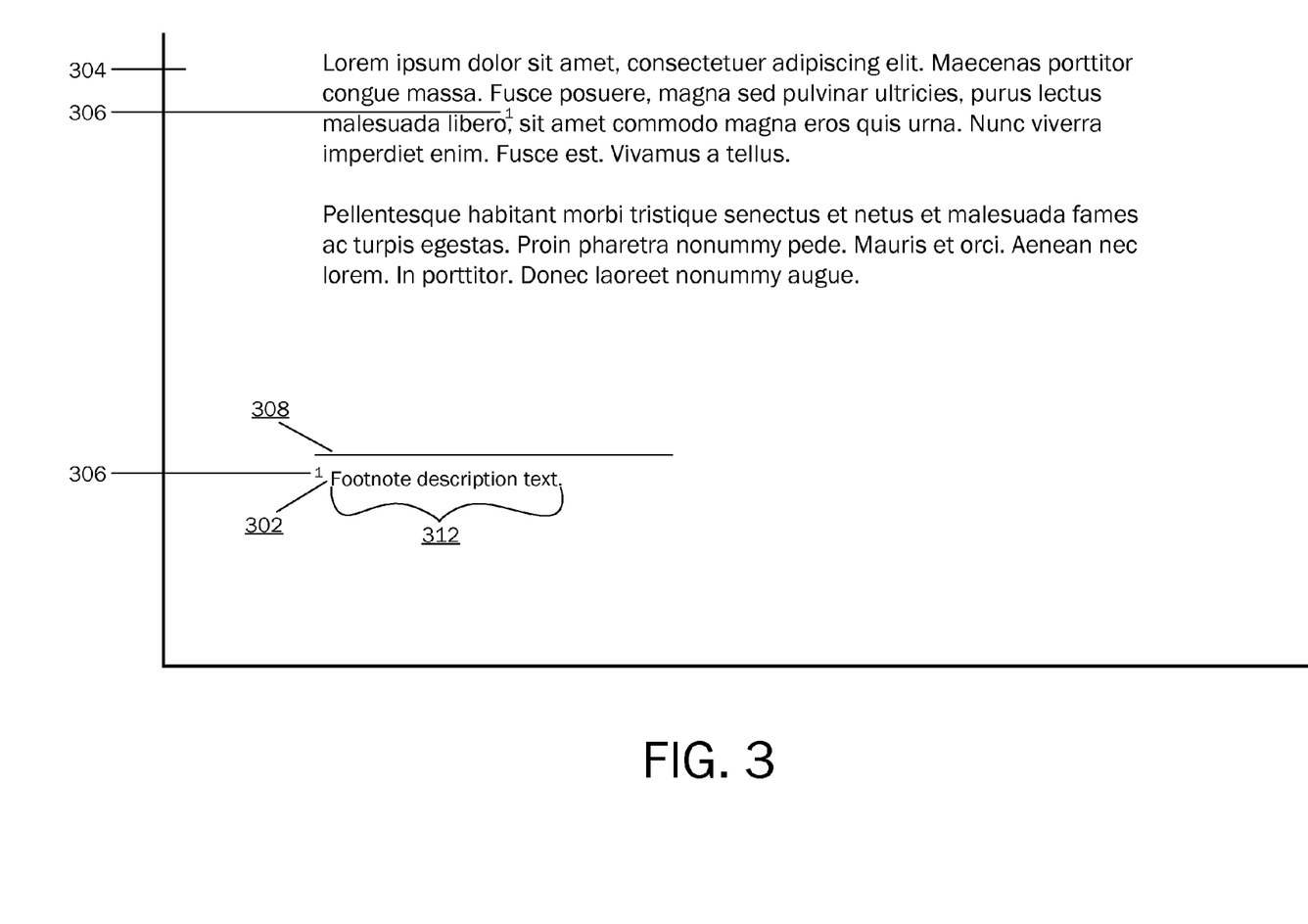
FIG. 3 is an illustration of an example footnote in a document.

An example of a footnote 302 is illustrated in FIG. 3. According to embodiments, a footnote 302 may be located in a footnote zone. A footnote zone may include an area at the bottom of a region. According to embodiments, when a fixed format document 106 is converted to a flow format document 108, information about bounding boxes of text-runs and page properties may be used to divide a document into blocks (i.e., regions) that can be processed independently. A region may include a table, a column, etc. For example, if a document comprises multiple columns, a footnote zone may be the area beneath each column, or may be the area at the bottom of the page 304 beneath all of the columns.

A document may include a footnote separator line 308, wherein a footnote separator line 308 may mark a beginning of a footnote zone. According to embodiments, a line node may be determined to be a footnote separator line 308 if the line node has a child element and if the child element is a graphic aggregation object. For example, a graphic aggregation object may include a graphical element belonging to a single entity based on such characteristics as overlap, proximity, etc. In addition, a line node may be determined to be a footnote separator line 308 if the height of the line node is less than an average text height on a page 304. If a footnote separator line 308 is detected, a footnote zone may be determined to be the area below the footnote separator line 308.

According to embodiments, a footnote 302 may be comprised of a footnote description 312. A footnote description 312 may include one or more paragraphs. A footnote 302 may comprise a footnote reference mark 306. A footnote reference mark 306 may be superscript and may include a number, letter, a symbol, or a custom mark. If a footnote 302 comprises a footnote reference mark 306, a matching footnote reference mark 306 may be included in the text in the main document on the same page 304 where the footnote 302 is located.

Figure 4:
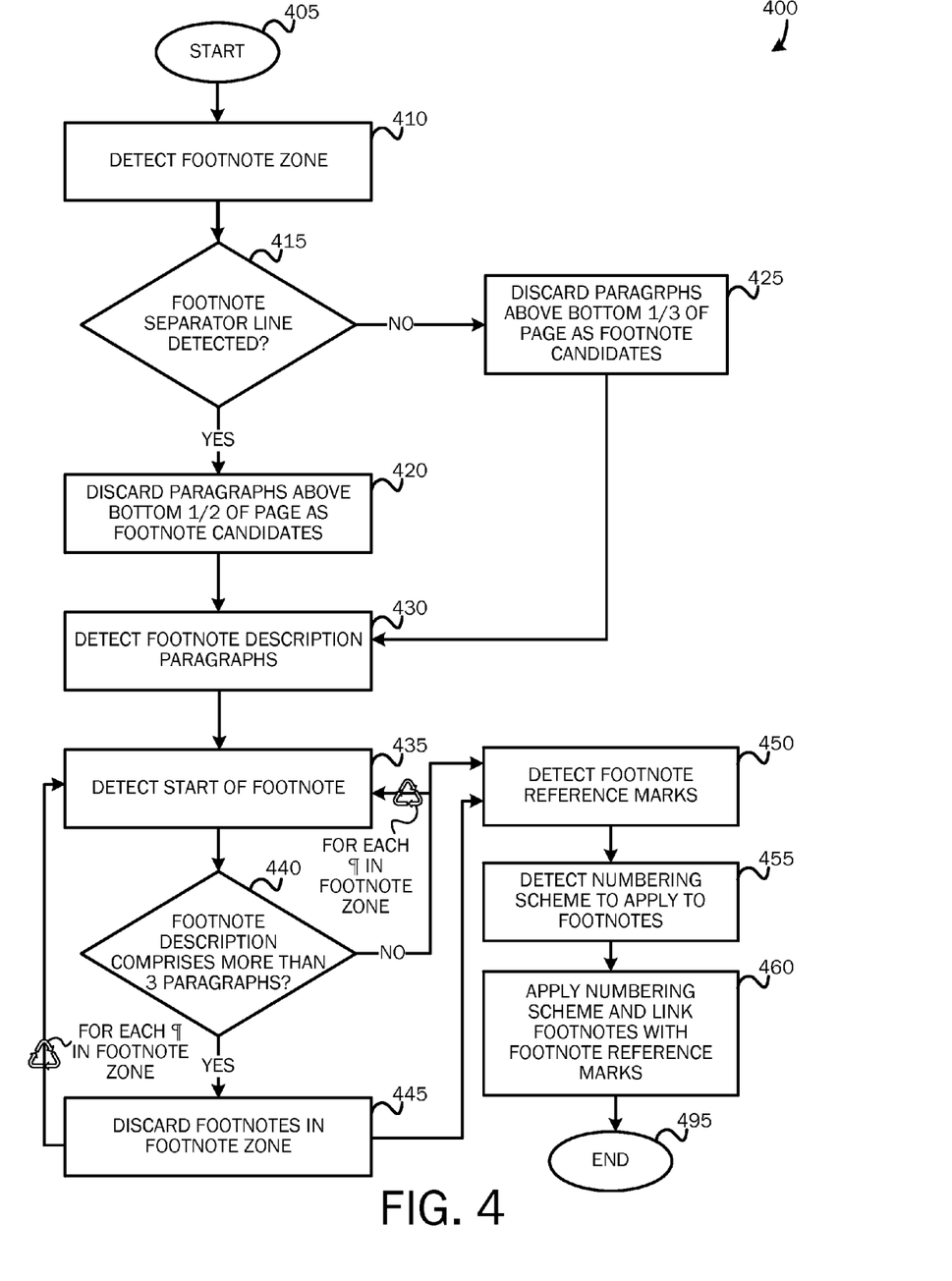
FIG. 4 is a flow chart of a method for detecting footnotes in a fixed format document.

FIG. 4 is a flow chart showing one embodiment of a footnote detection method 400 executed by a footnote engine 118. The method 400 starts at OPERATION 405 and proceeds to OPERATION 410 where a footnote zone may be detected. According to embodiments and as described above, a footnote zone may include an area at the bottom of a region. The footnote engine 118 may start at the bottom of a region and add paragraphs one-by-one to a footnote zone until all paragraphs in the region have been added to the footnote zone or until a footnote separator line 308 is detected. A footnote zone may be one or more paragraphs that contain one or more footnote candidates.

The method 400 proceeds to DECISION OPERATION 415, where a determination is made whether a footnote separator line 308 is detected. If a footnote separator line 308 is detected, at OPERATION 420, paragraphs above the bottom half of the page 304 may be discarded as possible footnote candidates. If a footnote separator line 308 is not detected at DECISION OPERATION 415, at OPERATION 425, paragraphs above the bottom third of the page 304 may be discarded as possible footnote candidates. Detection of a footnote separator line 308 may be considered a strong indicator of a footnote zone boundary. According to embodiments, OPERATIONS 420 and 425 may be performed to filter out false positives, wherein a false positive may be a portion of text mistakenly identified as a footnote 302. For example, OPERATIONS 420 and 425 may help reduce a false positive when a numbered list is spread across an entire column and is mistaken for a footnote 302.

The method 400 proceeds to OPERATION 430, where one or more paragraphs belonging to a footnote description 312 may be detected. Each footnote zone may be analyzed to determine a start of each paragraph in the footnote zone. At OPERATION 435, each paragraph in the footnote zone may be analyzed to determine a start of a footnote 302. If a footnote separator line 308 does not exist, detection of a start of a footnote 302 may include a paragraph beginning with a number written in superscript. If a footnote separator line 308 does exist, detection of a start of a footnote 302 may include a paragraph beginning with a superscript character or a number. For example, if a footnote separator line 308 is not detected (at DECISION OPERATION 415), at OPERATION 435, a paragraph may be determined to be a start of a footnote description 312 if the paragraph starts with a number written in superscript. The number written in superscript may be determined to be a matching footnote reference mark 306. If a footnote separator line 308 is detected (at DECISION OPERATION 415), at OPERATION 435, a paragraph may be determined to be a start of a footnote description 312 if the paragraph starts with a number (in superscript or not) or with any text written in superscript. The number or text may be determined to be a matching footnote reference mark 306.

The method 400 may proceed to DECISION OPERATION 440, where a determination is made whether the footnote description 312 comprises more than a predetermined number of paragraphs. If the footnote description 312 comprises more than the predetermined number of paragraphs, at OPERATION 445, the footnote 302 may be discarded from the footnote zone. For example, according to one embodiment, if a footnote description 312 of a footnote 302 comprises more than three paragraphs, the footnote 302 may be discarded from the footnote zone. That is, the footnote 302 may no longer be considered as a footnote candidate. As illustrated, OPERATIONS 435-445 may be exercised in a loop for each paragraph in a footnote zone.

After detecting footnote descriptions 312 for each footnote 302 candidate on a page 304, at OPERATION 450, matching reference marks 306 in the main content above the footnote zone may be detected and matched with corresponding footnote descriptions 312. According to embodiments, for each footnote description 312, its matching footnote reference mark 306 may be extracted. The text above the footnote zone (i.e., main document content) may be analyzed for text runs with the extracted matching footnote reference mark 306. According to an embodiment, text runs written in superscript may be analyzed first. If for a particular footnote description 312 no footnote reference mark 306 is found among superscript text runs, the rest of the main document content on the page 304 may be analyzed for a matching footnote reference mark 306.

To reduce a chance of a false positive, according to one embodiment, a constraint that a footnote reference mark 306 must be at the end of a text run may be exercised. As can be appreciated, it may not always be possible to find matching footnote reference marks 306 for all footnotes 302 on a page 304. According to an embodiment, if footnote reference marks 306 are found for less than half of detected footnotes 302 on a page 304, the footnote 302 candidates may be determined to be false positives (e.g., list items) and may be discarded as possible footnotes.

If a corresponding footnote reference mark 306 is not found (e.g., a footnote reference mark 306 is not written as superscript nor as regular text), a footnote reference mark 306 may be artificially placed after a previously recognized footnote reference mark 306. If a first footnote reference mark 306 is not detected, a footnote reference mark 306 may be placed at the beginning of the text on a page 304. If a last footnote reference mark 306 is not detected, a footnote reference mark 306 may be placed at the end of the text on a page 304.

After footnote descriptions 312 are detected and connected with corresponding footnote reference marks 306, the method 400 may proceed to OPERATION 455, where a footnote numbering scheme may be determined. Each matching footnote reference mark 306 on all pages 304 of a document may be analyzed to see if it is a valid element of a numbering scheme. According to an embodiment, footnote reference marks 306 may be analyzed in a sequence. The sequences of footnote reference marks 306 may be analyzed in the order in which they appear in a document. Footnote reference marks 306 may be cross-referenced with a previously defined set of possible numbering schemes.

As can be appreciated, a matching footnote reference mark 306 may be a valid numbering element in multiple numbering schemes. For example, a number represented with "i" may be a lower letter number nine (i.e., a, b, c, d, e, f, g, h, "i") or may be a Roman numeral 1 (i.e., i, ii, iii, iv, . . . ). A numbering scheme covering the longest subsequence of matching footnote reference marks 306 may be determined and applied to the footnotes 302. If some of the matching footnote reference marks 306 do not fit into a best match scheme, those footnote reference marks 306 may be determined to be custom reference marks. Custom reference marks may be determined to not belong to a numbering scheme, but may be reconstructed literally. For example, if a sequence of footnote reference marks 306 is detected to be: 1, 2, *, **, 3, 4, 5, 6, 7, 8, a determination may be made that the Arabic numbering scheme may be a best match for the sequence. Accordingly, the "*" and "**" may be treated as custom footnote reference marks 306.

At OPERATION 460, the numbering scheme may be applied to the footnotes 302 and footnote reference marks 306 may be linked with their corresponding footnotes 302. Detected footnotes 302 may be statically positioned at the end of a page 304 and may be positioned on the same page as their corresponding reference marks 306. The method 400 ends at OPERATION 495.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
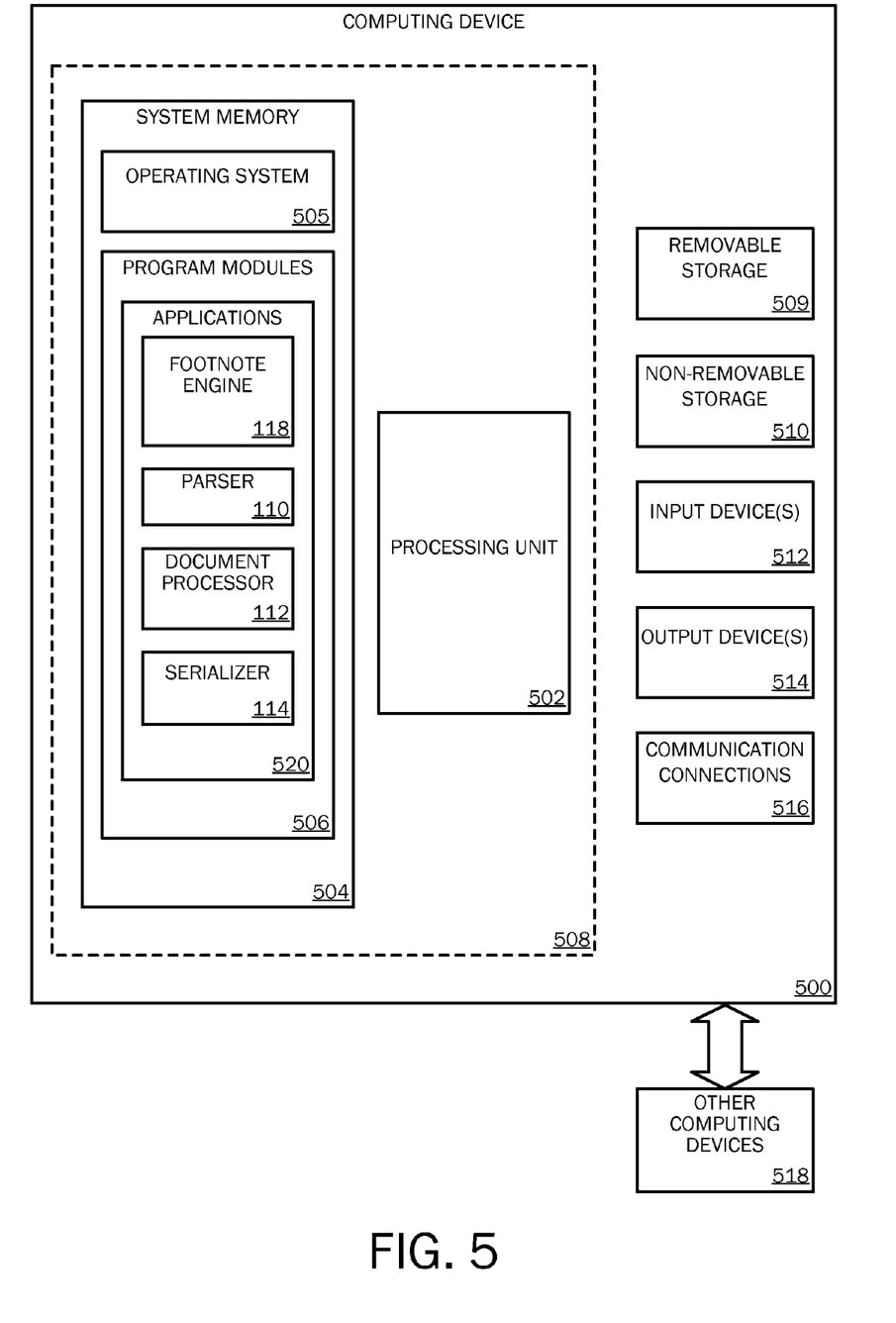
FIG. 5 is a block diagram illustrating example physical components of a computing device with which embodiments of the invention may be practiced.
Figure 6A:
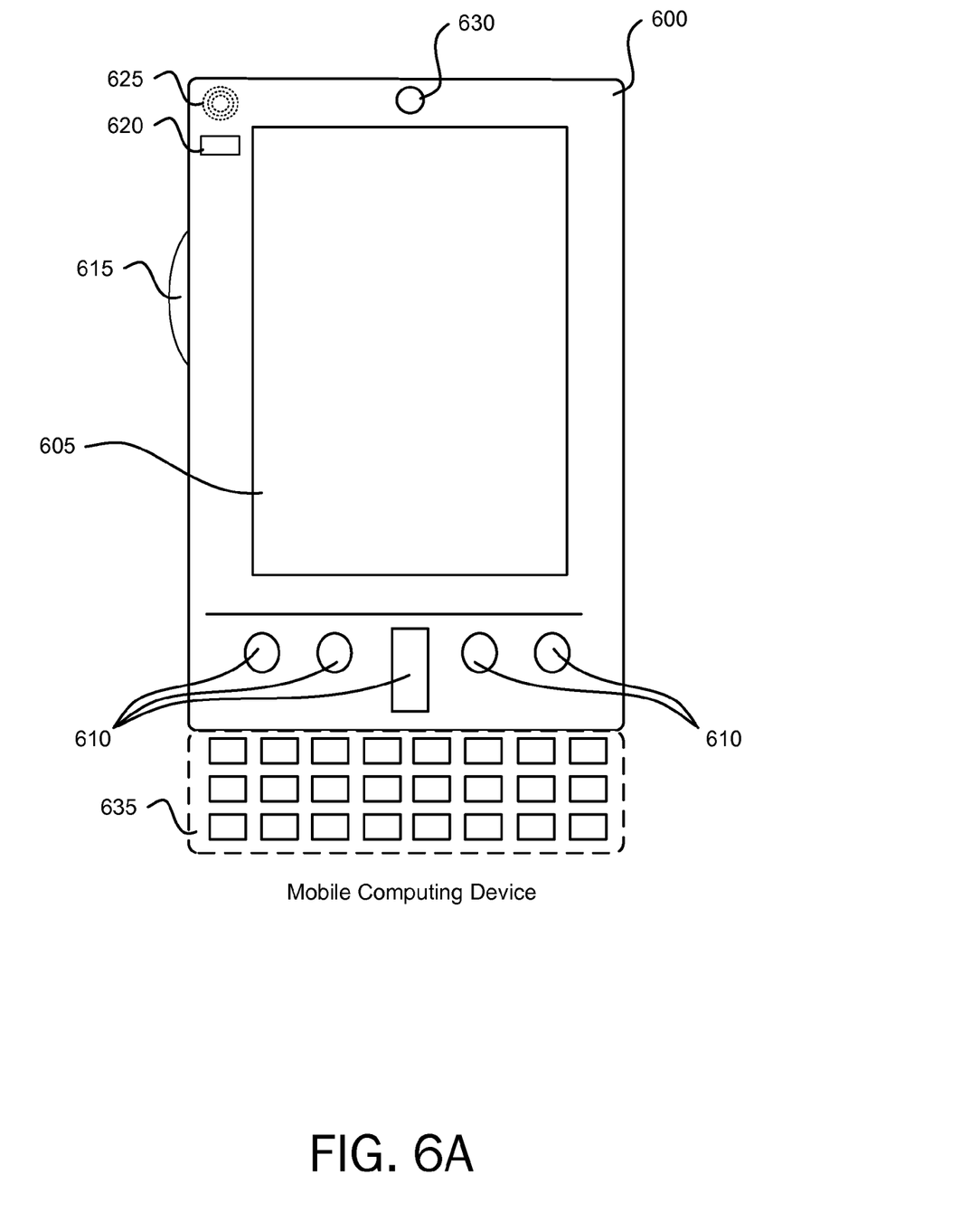
FIGS. 6A and 6B are simplified block diagrams of a mobile computing device with which embodiments of the present invention may be practiced.
Figure 6B:
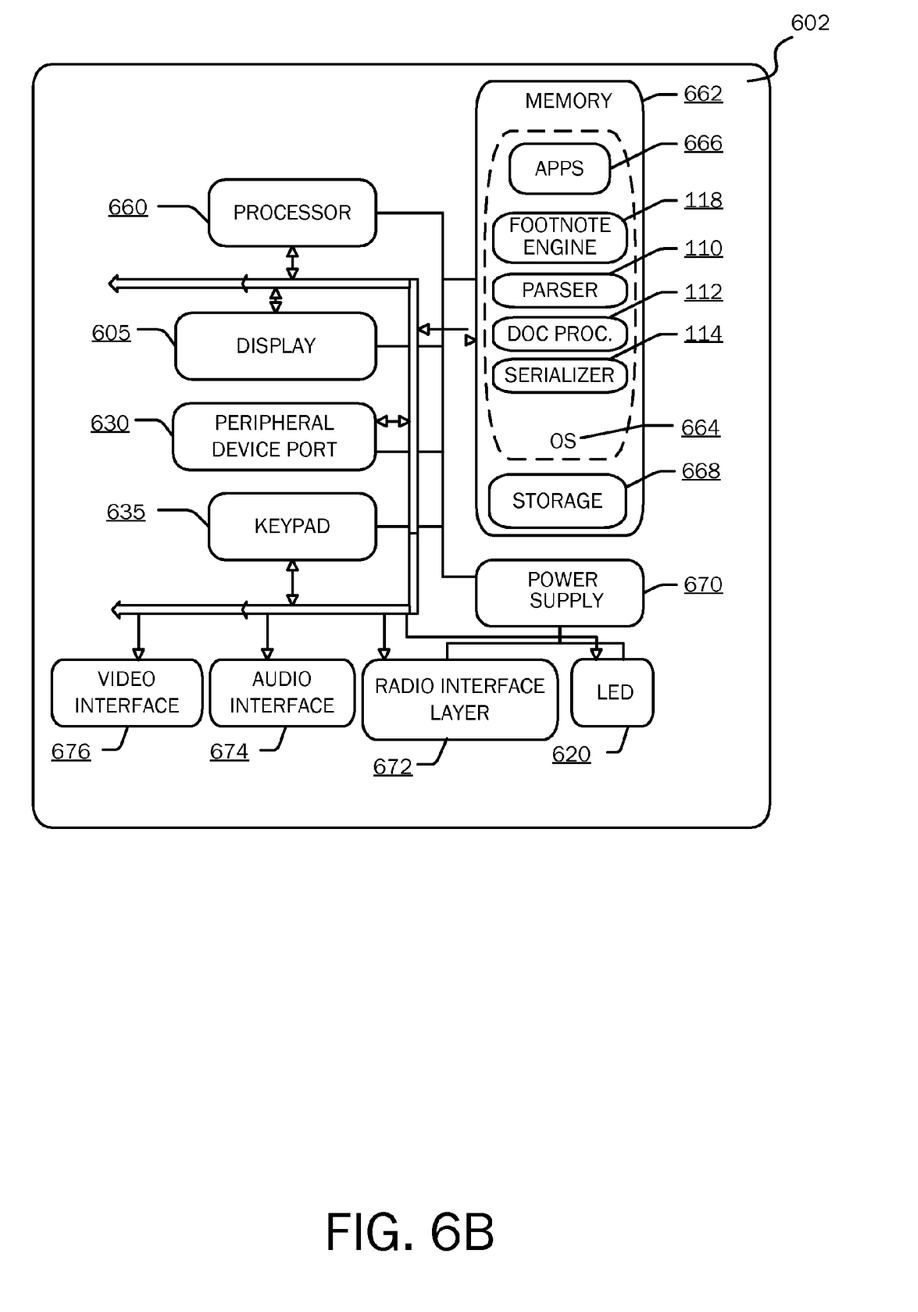
Figure 7:
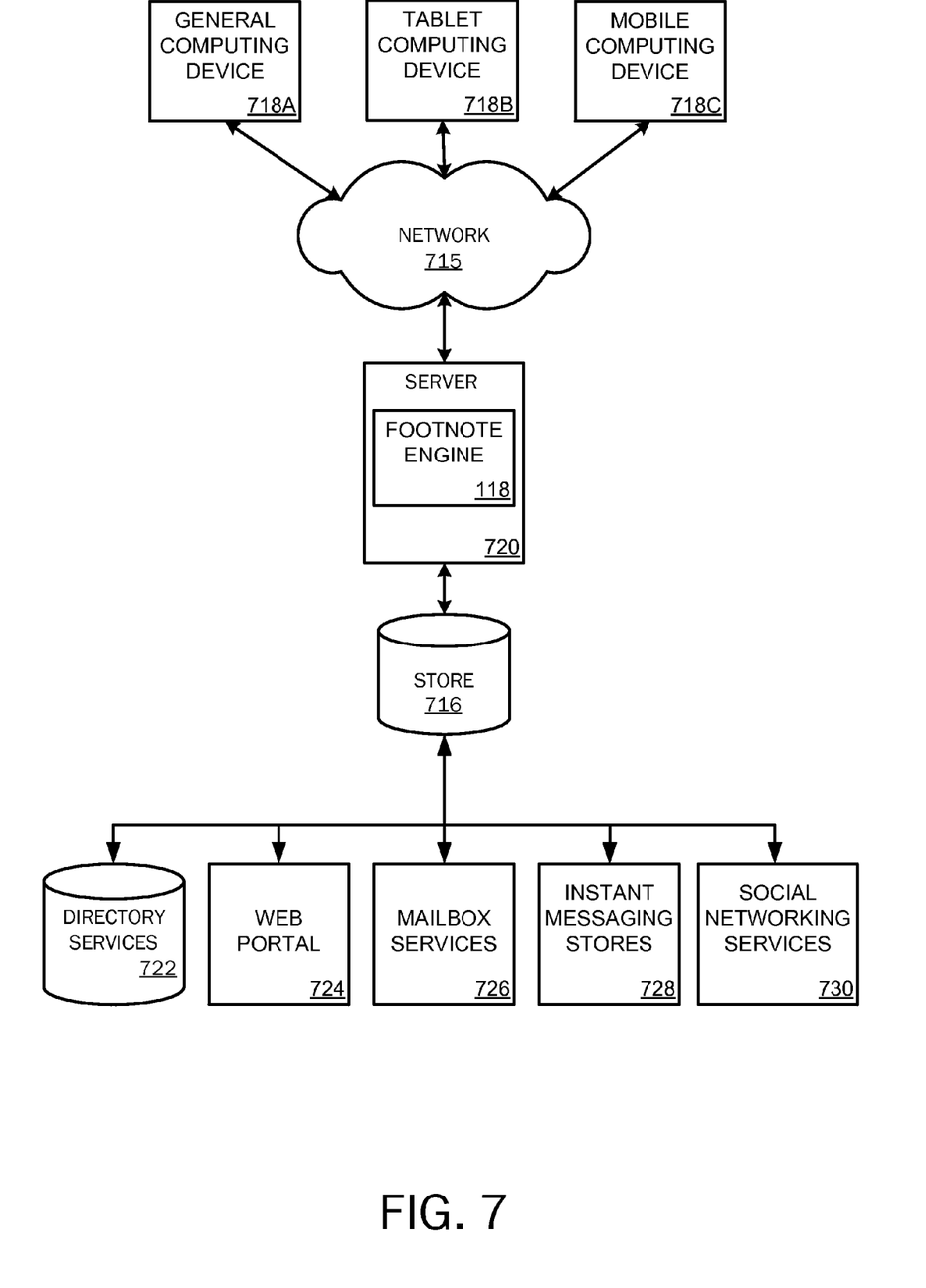
FIG. 7 is a simplified block diagram of a distributed computing system in which embodiments of the present invention may be practiced.

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating physical components (i.e., hardware) of a computing device 500 with which embodiments of the invention may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as the footnote engine 118, the document processor 112, the parser 110, the document converter 102, and the serializer 114. The operating system 505, for example, may be suitable for controlling the operation of the computing device 500. Furthermore, embodiments of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the footnote engine 118, the parser 110, the document processor 112, and the serializer 114) may perform processes including, but not limited to, one or more of the stages of the method 400 illustrated in FIG. 4. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the footnote engine 118, the parser 110, the document processor 112, and the serializer 114 may be operated via application-specific logic integrated with other components of the computing device 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 504, the removable storage device 509, and the non-removable storage device 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 500. Any such computer storage media may be part of the computing device 500.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which embodiments of the invention may be practiced. With reference to FIG. 6A, one embodiment of a mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the footnote engine 118, the parser 110, the document processor 112, and the serializer 114 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 602 provides notifications using the visual indicator 620 that can be used to provide visual notifications and/or an audio interface 674 producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668. Computer storage media may include volatile and nonvolatile, removable and non-removable media implemented in any method or technology for storage of information, such as computer readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for providing footnote 302 detection in a fixed format document 106 to one or more client devices, as described above. Content developed, interacted with, or edited in association with the footnote engine 118, the parser 110, the document processor 112, and the serializer 114 may be stored in different communication channels or other storage types. For example, various documents may be stored using a directory service 722, a web portal 724, a mailbox service 726, an instant messaging store 728, or a social networking site 730. The footnote engine 118, the parser 110, the document processor 112, and the serializer 114 may use any of these types of systems or the like for enabling data utilization, as described herein. A server 720 may provide the footnote engine 118, the parser 110, the document processor 112, and the serializer 114 to clients. As one example, the server 720 may be a web server providing the footnote engine 118, the parser 110, the document processor 112, and the serializer 114 over the web. The server 720 may provide the footnote engine 118, the parser 110, the document processor 112, and the serializer 114 over the web to clients through a network 715. By way of example, the client computing device 718 may be implemented as the computing device 500 and embodied in a personal computer 718*a*, a tablet computing device 718*b* and/or a mobile computing device 718*c* (e.g., a smart phone). Any of these embodiments of the client computing device 718 may obtain content from the store 716.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for detecting one or more footnotes in a fixed format document, the method comprising:
   detecting a footnote zone on a page in the fixed format document including detecting whether the fixed format document includes a footnote separator line;
   detecting one or more paragraphs in the footnote zone as footnote candidates, including discarding paragraphs above a selected portion of the fixed format document from being considered as footnote candidates;
   determining which of the one or more paragraphs belong to a footnote description of a footnote, including:
      determining a number of paragraphs in the footnote description; and
      if the footnote description comprises more than a selected number of paragraphs, discarding the footnote candidates in the footnote zone; and
      if the footnote description comprises less than the selected number of paragraphs:
         detecting a corresponding footnote reference mark in a main document flow on the page for each footnote;
         determining a footnote numbering scheme;
         applying the footnote numbering scheme to each footnote; and
         linking each footnote with the corresponding footnote reference mark in the main document flow on the page.

2. The method of claim 1, wherein detecting the footnote zone on the page comprises detecting an area at the bottom of a region and including the area at the bottom of the region to the footnote zone.

3. The method of claim 1, wherein detecting the footnote zone on the page comprises detecting an area below the footnote separator line to the footnote zone.

4. The method of claim 3, wherein detecting the footnote separator line comprises detecting a line node and determining:

a height of the line node is less than an average text height of text on the page.

5. The method of claim 1, wherein determining which of the one or more paragraphs belong to the footnote description of a footnote comprises:
analyzing each of the one or more paragraphs starting with last paragraph in the footnote zone;
if the footnote separator line is not found and if the paragraph starts with a superscript number, determining the paragraph is a first paragraph of the footnote description of a footnote; and
if the footnote separator line is found and if the paragraph starts with a number or any text written in superscript, determining the paragraph is the first paragraph of the footnote description of a footnote.

6. The method of claim 5, wherein paragraphs above the footnote separator line are discarded as possible footnote candidates.

7. The method of claim 1, wherein detecting the corresponding footnote reference mark in the main document flow on the page for each footnote comprises:
extracting a footnote reference mark from each footnote description; and
analyzing the main document flow on the page for a superscript text run comprising the extracted footnote reference mark.

8. The method of claim 7, further comprising:
for each footnote description, if the extracted footnote reference mark is not found in the superscript text run, analyzing the main document flow on the page for a non-superscript text run comprising the extracted footnote reference mark.

9. The method of claim 7, further comprising:
if the corresponding footnote reference mark is found for less than half of the footnotes on the page, discarding the footnotes.

10. The method of claim 1, where detecting the footnote numbering scheme comprises analyzing each footnote reference mark on all pages of the fixed format document to determine if the footnote reference mark is a valid element in a numbering scheme.

11. The method of claim 10, further comprising determining the numbering scheme that covers a longest subsequence of footnote reference marks.

12. The method of claim 10, further comprising:
if the footnote reference mark does not fit into the determined numbering scheme, determining the footnote reference mark to be a custom footnote reference mark to be reconstructed literally.

13. The method of claim 10, wherein determining the footnote numbering scheme further comprises analyzing whether the footnote reference mark is the valid element of the footnote numbering scheme.

14. The method of claim 1, further comprising statically positioning each of the one or more footnotes at an end of the page containing the corresponding footnote reference mark.

15. The method of claim 1, wherein discarding paragraphs above the selected portion of the fixed format document from being considered as footnote candidates further comprises discarding paragraphs above a bottom third of the fixed format document.

16. A system for detecting one or more footnotes in a document, the system comprising:
one or more processors; and
a memory coupled to the one or more processors, the one or more processors operable to:
detect a footnote zone on a page in the document including detecting whether the document includes a footnote separator line;
detect one or more paragraphs in the footnote zone as footnote candidates, including discarding paragraphs above a selected portion of the document from being considered as footnote candidates;
determine which of the one or more paragraphs belong to a footnote description of a footnote, including:
determining a number of paragraphs in the footnote description; and
if the footnote description comprises more than a selected number of paragraphs, discarding the footnote candidates in the footnote zone; and
if the footnote description comprises less than the selected number of paragraphs:
detect a corresponding footnote reference mark in a main document flow on the page for each footnote;
determine a footnote numbering scheme;
apply the footnote numbering scheme to each footnote; and
link each footnote with the corresponding footnote reference mark in the main document flow on the page.

17. The system of claim 16, wherein the footnote zone comprises an area at the bottom of a region and an area below the footnote separator line.

18. The system of claim 16, wherein the one or more processors are further operable to:
analyze each of the one or more paragraphs starting with last paragraph in the footnote zone;
if the footnote separator line is not found and if the paragraph starts with a superscript number, determine the paragraph is a first paragraph of the footnote description of a footnote; and
if the footnote separator line is found and if the paragraph starts with a number or any text written in superscript, determine the paragraph is the first paragraph of the footnote description of a footnote.

19. The system of claim 16, wherein the one or more processors are further operable to:
extract a footnote reference mark from each footnote description;
analyze the main document flow on the page for a superscript text run comprising the extracted footnote reference mark; and
if the extracted footnote reference mark is not found in the superscript text run, analyze the main document flow on the page for a non-superscript text run comprising the extracted footnote reference mark.

20. A computer readable storage device containing computer executable instructions which, when executed by a computer, perform a method for detecting one or more footnotes in a document, the method comprising:
detecting a footnote zone on a page in the document including detecting whether the document includes a footnote separator line;
detecting one or more paragraphs in the footnote zone as footnote candidates, including discarding paragraphs above a selected portion of the document from being considered as footnote candidates; and
determining which of the one or more paragraphs in the footnote zone belong to a footnote description of a footnote, including:
determining a number of paragraphs in the footnote description;

if the footnote description comprises more than a selected number of paragraphs, discarding the footnote candidates in the footnote zone;

if the footnote description comprises less than the selected number of paragraphs:
- detecting a corresponding footnote reference mark in a main document flow on the page for each footnote;
- determining a footnote numbering scheme;
- applying the footnote numbering scheme to each footnote; and
- linking each footnote with the corresponding footnote reference mark in the main document flow on the page.

\* \* \* \* \*